United States Patent Office 3,124,567  
Patented Mar. 10, 1964

3,124,567  
AZO DYES CONTAINING A DIOXOPYRAZOLIDINE RADICAL  
Willy Forter, Neuallschwil, Otto Senn, Arlesheim, and Walter Wehrli, Riehen, Basel, Switzerland, assignors to Sandoz Ltd., Basel, Switzerland  
No Drawing. Filed Apr. 12, 1962, Ser. No. 187,463  
Claims priority, application Switzerland Apr. 14, 1961  
6 Claims. (Cl. 260—163)

It has been found that new and valuable azo compounds of the general formula

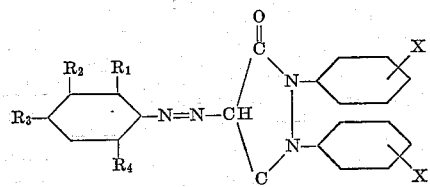

are obtained when an amine of the formula

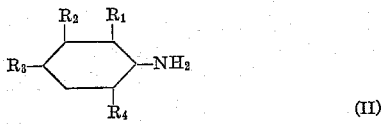

is diazotized and reacted with a dioxopyrazolidine of the formula

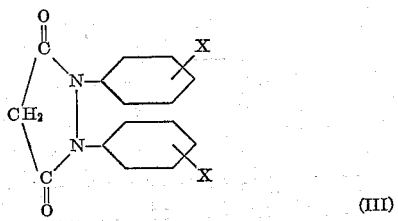

or when one of the other commonly used methods of synthesis for azo compounds of this type is employed. In Formulae I to III $R_1$ and $R_3$ represent hydrogen, halogen, preferably chlorine or bromine, the nitro group, an alkyl group, preferably with 1–4 carbon atoms, a carboxylic acid ester group with preferably not more than 4 carbon atoms in the alcoholic component, or a carboxylic acid amide group whose nitrogen atom may be substituted by lower alkyl groups, $R_2$ represents hydrogen, halogen, in particular chlorine or bromine, a carboxylic acid ester group as under $R_1$, or a carboxylic acid amide group, $R_4$ hydrogen, halogen, in particular chlorine or bromine, or alkyl, preferably with 1–4 carbon atoms, and X hydrogen or halogen, in particular chlorine or bromine.

The diazo component must contain either a nitro group or a carboxylic acid amide group or a carboxylic acid ester group or 1–4, or preferably 1–2, halogen atoms; it also may contain a nitro, alkyl, carboxylic acid amide or carboxylic acid ester group in addition to halogen atoms.

Examples of diazo compounds which are highly suitable for the present purpose are 4-nitro-1-aminobenzene, 2-chloro-1-aminobenzene, 2,4-dichloro-1-aminobenzene, 2-nitro-4-chloro-1-aminobenzene, 4-aminobenzoic acid amide, 2-, 3- or 4-aminobenzoic acid methyl ester or 2-, 3- or 4-aminobenzoic acid ethyl ester.

The coupling reaction is carried out under the normal conditions and preferably in the cold, though the reaction mixture may be heated if necessary.

The azo compounds thus obtained are excellent pigments for the coloration of plastics, resins, paper, and paint and lacquer media of all kinds, and for the spin dyeing of secondary cellulose acetate and cellulose triacetate. They are also suitable for printing textiles and paper. In the form of disperse dyes they can be employed for the dyeing of hydrophobic filaments and fibers, e.g. of linear aeromatic polyesters. The dyeings, prints and colorations which are obtained in these various fields of application have very good color fastness properties, being especially notable for fastness to washing, perspiration, pleating, heat setting, light and gas fumes. The new dyes are particularly valuable in mixture with blue anthraquinone dyes, as the latter in combination with many of the known yellow disperse dyes show the undesirable characteristic of catalytic fading on exposure to light. In blended fabrics of polyester fiber and wool the wool is largely reserved by the dyes, and the reserve can be improved by one of the commonly used reduction clearing treatments.

In the examples the parts and percentages are by weight and the temperatures in degrees centigrade.

EXAMPLE 1

17.2 parts of 1-amino-2-chloro-4-nitrobenzene are diazotized with 6.9 parts of sodium nitrite in the normal way. The resulting solution of the diazo compound is run slowly with stirring into a solution, cooled to 0°, of 24.2 parts of 1,2-diphenyl-3,5-dioxopyrazolidine in 250 parts of water and 11 parts of 30% sodium hydroxide solution. Simultaneously, further sodium hydroxide solution is added to maintain the pH of the reaction mixture at 8. The azo compound thus formed is filtered off and washed until neutral. It can be purified with hot ethanol and a little glacial acetic acid. Its melting point is 216–217°.

The product is converted into a dyeing preparation by grinding with a suitable dispersing agent and, if necessary, a standardizing agent and the other additives normally used in dyeing. These preparations can be used for preparing aqueous dye dispersions from which linear aromatic polyester fibers of terephthalic acid and ethylene glycol are dyed in reddish yellow shades. The dyeings have excellent fastness to light, washing, water, perspiration, pleating and heat setting, and are completely free from the phenomenon of catalytic fading. Wool present in the dyebath remains undyed, the reserve of this fiber being especially good when dyeing is followed by aftertreatment with an alkaline reducing agent, e.g. a dithionite. Printing pastes can be prepared with this dye in the known manner by the addition of a thickening agent. The dye can be applied in combination with red or blue disperse dyes.

EXAMPLE 2

14.2 parts of 4-chloro-2-methyl-1-aminobenzene are diazotized at 0° in 100 parts of water with 6.9 parts of sodium nitrite and 25 parts of 30% hydrochloric acid. The clear solution is run into a solution of 24.2 parts of 1,2-diphenyl-3,5-dioxopyrazolidine and 11 parts of 30% sodium hydroxide solution in 250 parts of water. Throughout the duration of the reaction the pH is held at 7.5–8 by gradual addition of 25% ammonia, and the temperature maintained below 5° by the addition of ice. On completion of the reaction the dye is filtered, washed and dried.

10 parts of the dye are ground with 10 parts of secondary cellulose acetate and 160 parts of acetone in a ball mill. The resulting suspension is run into water, and the product filtered off, washed with water and dried. The dyeing preparation obtained in this way is used for dyeing secondary cellulose acetate in the spinning solution. It gives deep yellow shades which are fast to light, washing, peroxide, hydrosulfite, dry cleaning, cross dyeing, and gas fumes.

They can also be made up into a valuable dyeing preparation for polyester fibers using the method described in Example 1.

EXAMPLE 3

13.8 parts of 4-nitro-1-aminobenzene are diazotized with 6.9 parts of sodium nitrite in the normal way. The solution of the diazo compound is run into a solution, cooled to 0°, of 32.1 parts of 4',4''-dichloro-1,2-diphenyl-3.5-dioxopyrazolidine in 200 parts of water and 11 parts of 30% sodium hydroxide solution, the pH being maintained at 7.5–8 by the addition of sodium carbonate.

The insoluble yellow dye is filtered off, washed with water and dried. Its melting point is 235°. On conversion into a finely divided dyeing preparation it dyes polyester fibers in yellow shades of excellent fastness to light and sublimation. When in place of 4-nitro-1-aminobenzene, 17.2 parts of 4-chloro-2-nitro-1-aminobenzene or 2-chloro-4-nitro-1-aminobenzene are used, dyes with similar properties are obtained.

EXAMPLE 4

15.1 parts of 4-aminobenzoic acid methyl ester are mixed with 100 parts of water and 25 parts of 30% hydrochloric acid at 0° and diazotized with 6.9 parts of sodium nitrite. The resulting solution is added to a solution of 24.2 parts of 1.2-diphenyl-3.5-dioxopyrazolidine at 0° and pH 8. The sparingly soluble dye thus formed is filtered, washed with cold water until neutral, and dried. It melts at 188° and dyes polyester fibers in fast-to-light yellow shades.

The 4-aminobenzoic acid methyl ester can be replaced by the isomers which contain the amino group in the 2- or 3-position, or by the corresponding ethyl esters, to give dyes with similar properties.

The dyes of Formula I listed in the following table can be produced by the procedures described in Examples 1 to 4.

Table

| Example No. | $R_1$ | $R_2$ | $R_3$ | $R_4$ | X | Shade on polyester fiber |
|---|---|---|---|---|---|---|
| 5 | $NO_2$ | H | Cl | H | H | reddish yellow. |
| 6 | Cl | H | $NO_2$ | Cl | H | Do. |
| 7 | Cl | H | H | H | H | yellow. |
| 8 | H | Cl | H | Cl | H | Do. |
| 9 | Cl | H | Cl | H | H | Do. |
| 10 | $NO_2$ | H | Cl | H | Cl | reddish yellow. |
| 11 | $NO_2$ | H | H | H | H | Do. |
| 12 | H | H | $NO_2$ | H | H | Do. |
| 13 | $CH_3$ | H | $NO_2$ | H | H | Do. |
| 14 | $NO_2$ | H | $CH_3$ | H | H | Do. |
| 15 | H | H | $CONH_2$ | H | H | yellow. |
| 16 | H | H | $CONH\text{-}CH_3$ | H | H | Do. |

Formulae of representative azo compounds of the foregoing examples are as follows.

Example 1:

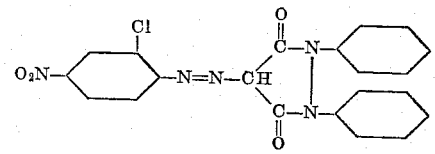

Example 2:

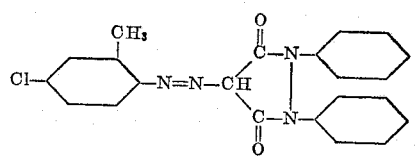

Example 3:

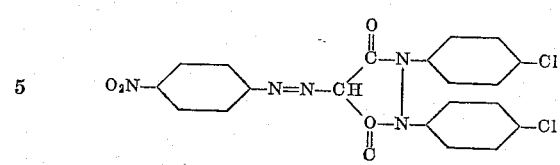

Example 4 (first paragraph):

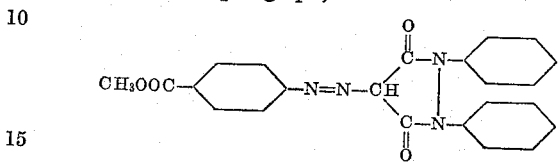

Example 4 (second paragraph):

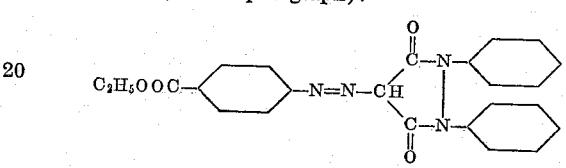

Example 4 (second paragraph):

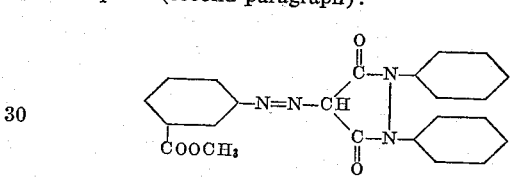

Example 5:

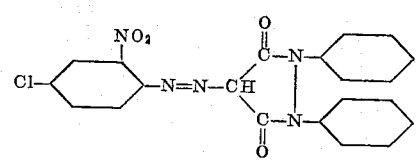

Having thus disclosed the invention, what we claim is.
1. Azo compound of the formula

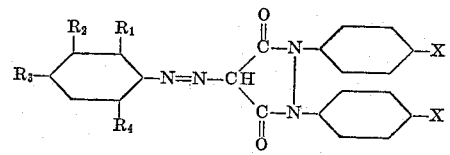

wherein
  $R_1$ and $R_3$ each represents a member selected from the group consisting of H, Cl, Br, $NO_2$, alkyl with 1 to 4 carbon atoms, —COO.lower alkyl wherein the alkyl contains 1 to 4 carbon atoms, —$CONH_2$, and —$CONH.CH_3$,
  $R_2$ represents a member selected from the group consisting of H, Cl, Br and —COO.lower alkyl wherein the alkyl contains 1 to 4 carbon atoms,
  $R_4$ represents a member selected from the group consisting of H, Cl, Br and alkyl with 1 to 4 carbon atoms, and
  X represents a member selected from the group consisting of H, Cl and Br,
the diazo moiety

containing at least one member selected from the group consisting of $NO_2$, —$CONH_2$, —$CONH.CH_3$, —COO.-lower alkyl wherein the alkyl contains 1 to 4 carbon atoms, Cl and Br.

2. The azo compound of the formula
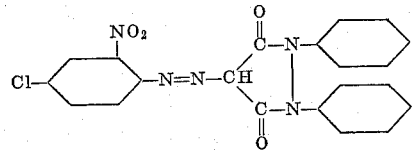
3. The azo compound of the formula
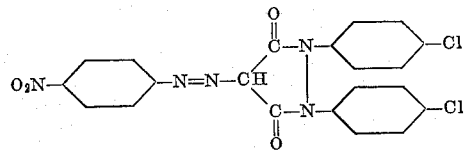
4. The azo compound of the formula
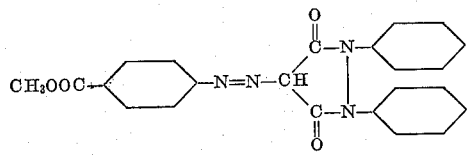
5. The azo compound of the formula
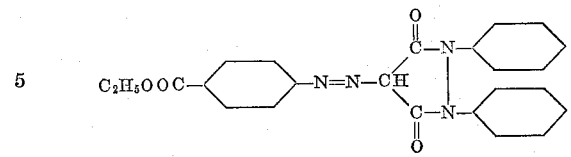
6. The azo compound of the formula
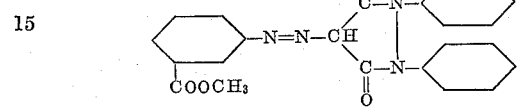
References Cited in the file of this patent
UNITED STATES PATENTS
2,150,180    McNalley _____ Mar. 14, 1939